United States Patent
Rao et al.

(10) Patent No.: US 7,602,698 B2
(45) Date of Patent: Oct. 13, 2009

(54) SYSTEMS AND METHODS FOR PROVIDING MULTI-LAYER PROTECTION SWITCHING WITHIN A SUB-NETWORKING CONNECTION

(75) Inventors: Rajan V. Rao, Ashburn, VA (US);
Ambrose Jay Slone, Ashburn, VA (US);
Sridhar Vasireddy, Leesburg, VA (US);
Christopher David Roller, Fairfax, VA (US)

(73) Assignee: Tellabs Operations, Inc., Naperville, IL (US)

( * ) Notice: Subject to any disclaimer, the term of this patent is extended or adjusted under 35 U.S.C. 154(b) by 956 days.

(21) Appl. No.: 10/791,506

(22) Filed: Mar. 2, 2004

(65) Prior Publication Data

US 2005/0195807 A1    Sep. 8, 2005

(51) Int. Cl.
*H04L 12/26* (2006.01)
(52) U.S. Cl. .................................................... 370/216
(58) Field of Classification Search ................. 370/395, 370/228, 223, 217, 225, 216, 16; 395/200
See application file for complete search history.

(56) References Cited

U.S. PATENT DOCUMENTS

| | | | |
|---|---|---|---|
| 5,216,666 A | | 6/1993 | Stalick |
| 5,537,393 A | * | 7/1996 | Shioda et al. ............... 370/223 |
| 5,838,924 A | * | 11/1998 | Anderson et al. ........... 709/239 |
| 6,597,826 B1 | | 7/2003 | Ramaswami et al. |
| 6,606,297 B1 | | 8/2003 | Magill et al. |
| 6,775,228 B1 | * | 8/2004 | Solana De Quesada ..... 370/217 |
| 6,810,011 B1 | * | 10/2004 | Betts .......................... 370/228 |

(Continued)

FOREIGN PATENT DOCUMENTS

DE    101 52 339 A1    4/2003

(Continued)

OTHER PUBLICATIONS

Chatter F: "La Protection Dans Les Reseaux SDH" Echo Des Recherches, ISSY/Moulineaux, FR, No. 161, 1995, pp. 15-28, XP000614834 ISSN: 0012-9283 abstract, p. 21, middle of left-hand column—p. 26, middle-column figures 6-8, 15, 16.

(Continued)

*Primary Examiner*—Kwang B Yao
*Assistant Examiner*—Syed Bokhari
(74) *Attorney, Agent, or Firm*—Lawrence Cho; Dean D. Small; The Small Patent Law Group

(57) ABSTRACT

A sub-network system includes line modules configured to receive bridged traffic signals over individual corresponding channels. The line modules are grouped into sets at a lower protection layer and an upper protection layer. The line modules are activated/deactivated based on different upper and lower protection schemes associated with the upper and lower protection layers. The sub-network also includes state maps associated with each of the line modules. The state maps store state data that activates and deactivates the line modules. The state maps are updated in accordance with the upper protection scheme to perform inter-leg switching between a first line module and a second line module. A network control module interconnected with the line modules performs inter-leg switching by updating the state data in the state maps for corresponding line modules in associated working and protection legs.

27 Claims, 8 Drawing Sheets

U.S. PATENT DOCUMENTS

| | | | |
|---|---|---|---|
| 2003/0206516 A1* | 11/2003 | Chen et al. | 370/227 |
| 2004/0208118 A1* | 10/2004 | DeBoer et al. | 370/223 |
| 2005/0089027 A1* | 4/2005 | Colton | 370/380 |

FOREIGN PATENT DOCUMENTS

| | | |
|---|---|---|
| EP | 0 570 882 A2 | 11/1993 |
| EP | 1499155 | 1/2005 |
| GB | 2396789 | 6/2004 |
| WO | WO-0230130 | 4/2002 |
| WO | WO 02/254821 A | 7/2002 |
| WO | WO-2005041505 | 5/2005 |

OTHER PUBLICATIONS

Andreas Felekis and Demetris Milis; "Emerging Technologies for Fibre Network Survivability"; http://www-dse.doc.ic.ac.uk/~nd/surprise_96/journal/vol4/af5/report.html; Date Unknown; 12 pgs.

* cited by examiner

FIG. 4

SNC Working

1+1 A Protect (130)

| 122 SNC MAP | 1+1 MAP | 138 VT MAP |
|---|---|---|
| FFFFFFFF<br>FFFFFFFF<br>FFFFFFFF<br>FFFFFFFF<br>FFFFFFFF<br>FFFFFFFF<br>FFFFFFFF<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 |

1+1 A Working (132) — 146

| 124 SNC MAP | 1+1 MAP | 140 VT MAP |
|---|---|---|
| FFFFFFFF<br>FFFFFFFF<br>FFFFFFFF<br>FFFFFFFF<br>FFFFFFFF<br>FFFFFFFF<br>FFFFFFFF<br>00000000 | FFFFFFFF<br>FFFFFFFF<br>FFFFFFFF<br>FFFFFFFF<br>FFFFFFFF<br>FFFFFFFF<br>FFFFFFFF<br>FFFFFFFF | FFFFFFFF<br>FFFFFFFF<br>FFFFFFFF<br>FFFFFFFF<br>FFFFFFFF<br>FFFFFFFF<br>FFFFFFFF<br>00000000 |

SNC Protect

1+1 B Protect (134)

| 126 SNC MAP | 1+1 MAP | 142 VT MAP |
|---|---|---|
| 00000000<br>FFFFFFFF<br>FFFFFFFF<br>FFFFFFFF<br>FFFFFFFF<br>FFFFFFFF<br>FFFFFFFF<br>FFFFFFFF | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 |

1+1 B Working (136) — 148

| 128 SNC MAP | 1+1 MAP | 144 VT MAP |
|---|---|---|
| 00000000<br>FFFFFFFF<br>FFFFFFFF<br>FFFFFFFF<br>FFFFFFFF<br>FFFFFFFF<br>FFFFFFFF<br>FFFFFFFF | FFFFFFFF<br>FFFFFFFF<br>FFFFFFFF<br>FFFFFFFF<br>FFFFFFFF<br>FFFFFFFF<br>FFFFFFFF<br>FFFFFFFF | 00000000<br>FFFFFFFF<br>FFFFFFFF<br>FFFFFFFF<br>FFFFFFFF<br>FFFFFFFF<br>FFFFFFFF<br>FFFFFFFF |

120

SNC Auto Switching Flow Diagram on IOB(s)

Mixed Mode Support

SYSTEMS AND METHODS FOR PROVIDING MULTI-LAYER PROTECTION SWITCHING WITHIN A SUB-NETWORKING CONNECTION

BACKGROUND OF THE INVENTION

The invention relates generally to systems and methods of subnetwork connection protection. More specifically, certain embodiments generally relate to protection switching mechanisms and methods that afford multiple layers of protection through combined inter-leg and intra-leg switching.

A wide variety of communications networks exist today and are continuously being improved. These communications networks support large volumes of traffic and offer a wide variety of services. There is increased need for the reliable and continuous operation of such networks due to the ever increasing traffic loads and growing reliance on communications networks for both business and personal use. An important element of reliability is the ability to quickly detect failures within the network and to automatically correct or restore the communications link. Self-healing methods, which automatically restore network connections after failure, exist for certain network architectures. Self-healing methods typically rely on distributed control to ensure fast fault recovery and to protect against catastrophic failure.

In certain network architectures, protection from failure has been addressed by adding redundant hardware and traffic channels. Typically, redundant networks include backup boards or cards that convey traffic signals identical to the traffic signals on a primary board or card. The primary and back-up cards are also referred to as working and protection cards. Throughout, the terms "primary" and "working" are used interchangeably, and the terms "back-up" and "protection" are used interchangeably. When a failure occurs on the primary board, the traffic to the backup board is utilized to ensure reliable and continuous service.

One example of a redundant protection scheme is a "1+1 protection scheme" in which every primary board is uniquely associated with a backup board. The 1+1 protection scheme protects against single board failures by affording hitless protection switching, namely the ability to switch in a backup board in the event the primary board fails before frame synchronization is lost.

Another conventional protection scheme is sub-network connection protection (SNCP). SNCP is a SDH-standard path protection mechanism (defined in ITU-T G.841) similar to UPSR (Bellcore GR-1400) in the SONET standard. In accordance with SNCP, a permanent source bridge is provided on the transmit side, and a selector function is implemented on the receive side. SNCPs are unidirectional, and switching is performed in a manner very similar to 1+1 and UPSR protection schemes. The ITU-T G.841 and Bellcore GR-1400 standards are incorporated herein in their entirety by reference.

Another conventional protection scheme is "1:N protection", which allows a single backup or protection card to provide shared or limited protection to multiple primary or working cards. In a 1:N protection scheme, multiple working cards convey unique and separate traffic signals, but are protected by a common, single protection card. The working cards are afforded a priority distribution that determines the extent to which each working card is protected by the protection card.

However, conventional protection schemes have experienced limited success. Conventional protection schemes, such as the 1+1, SNC (UPSR) and 1:N protection schemes, correlate each working port, path or card respectively with at most a single protection port, path or card. In the 1:N protection scheme, multiple working cards are correlated to a common single protection card. While these protection schemes are able to adequately address failures within one or a limited number of working cards, these protection schemes do not afford added backup in the event that the first layer of protection experiences failures or faults. For example, in the 1+1 protection scheme, when the working card and the protection card both fail, a catastrophic failure would then be experienced and frame synchronization would be lost. In SNC and UPSR protection schemes, when both work and protect paths fail the traffic would be lost. In the 1:N protection scheme, a single protection card supports multiple working cards. Hence, once a working card fail and fully load the protection card, the remaining working cards have no further backup protection. Also, once the protection card in the 1:N protection scheme fails, no additional layers of protection are afforded.

A need remains for an improved protection scheme for paths or sub-network connections.

BRIEF DESCRIPTION OF THE INVENTION

A multi layered protection scheme is supported with SNC protection on top of 1+1, UPSR and/or 1:N protection schemes.

A subnetwork connection system is provided that includes line modules configured to receive traffic signals over bridged, individual corresponding channels. The line modules are grouped into sets at a lower protection layer, while the sets of line modules are organized into working legs and protection legs at an upper protection layer. The line modules in working and protection legs are monitored for defects that contribute to automatic protection switching. These defects include: AIS-P, LOP-P, UNEQ-P, AIS-V, LOP-V, UNEQ-V, DSn-AIS and DSn-LOF. The line modules are activated and deactivated based on different upper and lower protection schemes associated with the upper and lower protection layers, respectively. The subnetwork connection system further includes state maps associated with each of the line modules. The state maps store state data that activates and deactivates the line modules. The state maps are updated in accordance with the lower protection scheme to permit intra-leg switching between the line modules within one working leg or within one protection leg. The state map is also updated in accordance with the upper protection scheme to perform inter-leg switching between a first line module in one of the working and protection legs and a second line module in the other of the working and protection legs. The subnetwork connection system also includes a network control module interconnected with the line modules. The control module performs inter-leg switching by updating the state data in the state maps for corresponding line modules in associated working and protection legs.

In one embodiment of the subnetwork connection system, the line modules constitute I/O boards and the network control module performs automatic switching between a primary I/O board in the working leg and a primary I/O board in the protection leg when a defect is experienced in the traffic signal. By way of example only, the lower protection scheme may be one of a 1+1 protection scheme, UPSR protection and a 1:N protection scheme, while the upper protection scheme may be a subnetwork connection protection (SNC) scheme.

In certain embodiments, the line modules generate a lower layer state map based on one of 1+1, UPSR and 1:N protection schemes, while the network control module generates an upper layer state map based on an SNC protection scheme.

The upper and lower state maps are logically combined to create virtual tributary (VT) state maps that are used to activate and deactivate corresponding line modules. Optionally, the line modules may individually perform intra-leg switching by updating state maps locally residing on each line module within a common single working leg of the subnetwork connection system.

In accordance with an alternative embodiment, a method is provided for protection switching in a subnetwork connection. The method includes receiving traffic signals at line modules that are grouped into sets, where the sets of line modules are organized into working legs and protection legs. The method further includes storing state data in state maps associated with each of the line modules. Inter-leg switching is performed between a line module in a working/protection leg and a line module in protection/working leg by updating the state maps in accordance with an inter-leg protection scheme. The method also includes activating and deactivating the line modules based on the updates to the state maps.

The inter-leg switching could be automatic or user initiated. The automatic inter-leg switching could result due to one of these defects on work/protect leg: AIS-P, LOP-P, UNEQ-P, AIS-V, LOP-V, UNEQ-V, DSn-AIS, DSn-LOF. The user initiated switch could be as a result of LOCKOUT, FORCED or MANUAL switch requests issued through operate protection switch commands to the system. The priority (as defined in ITU-T G.841 standard) in which requests are serviced by the system to complete automatic switch or user switch requests is as follows:
1. Lockout of protection
2. Forced switch
3. AIS-P, LOP-P, UNEQ-P, AIS-V, LOP-V, UNEQ-V, DSn-AIS, DSn-LOF
4. Manual switch
5. Wait to restore Optionally, the method may further include intra-leg switching between line modules in one of the working and protection legs by updating state maps in accordance with an intra-leg protection scheme. For example, the intra-leg protection scheme may be one of a 1+1 protection, UPSR protection and a 1:N protection scheme. As a further option, separate upper and lower layer state maps may be generated and logically combined to create state maps associated with each of the line modules.

BRIEF DESCRIPTION OF THE DRAWINGS

FIG. 4 illustrates an exemplary collection of state maps.

DETAILED DESCRIPTION OF THE INVENTION

Figure 1:
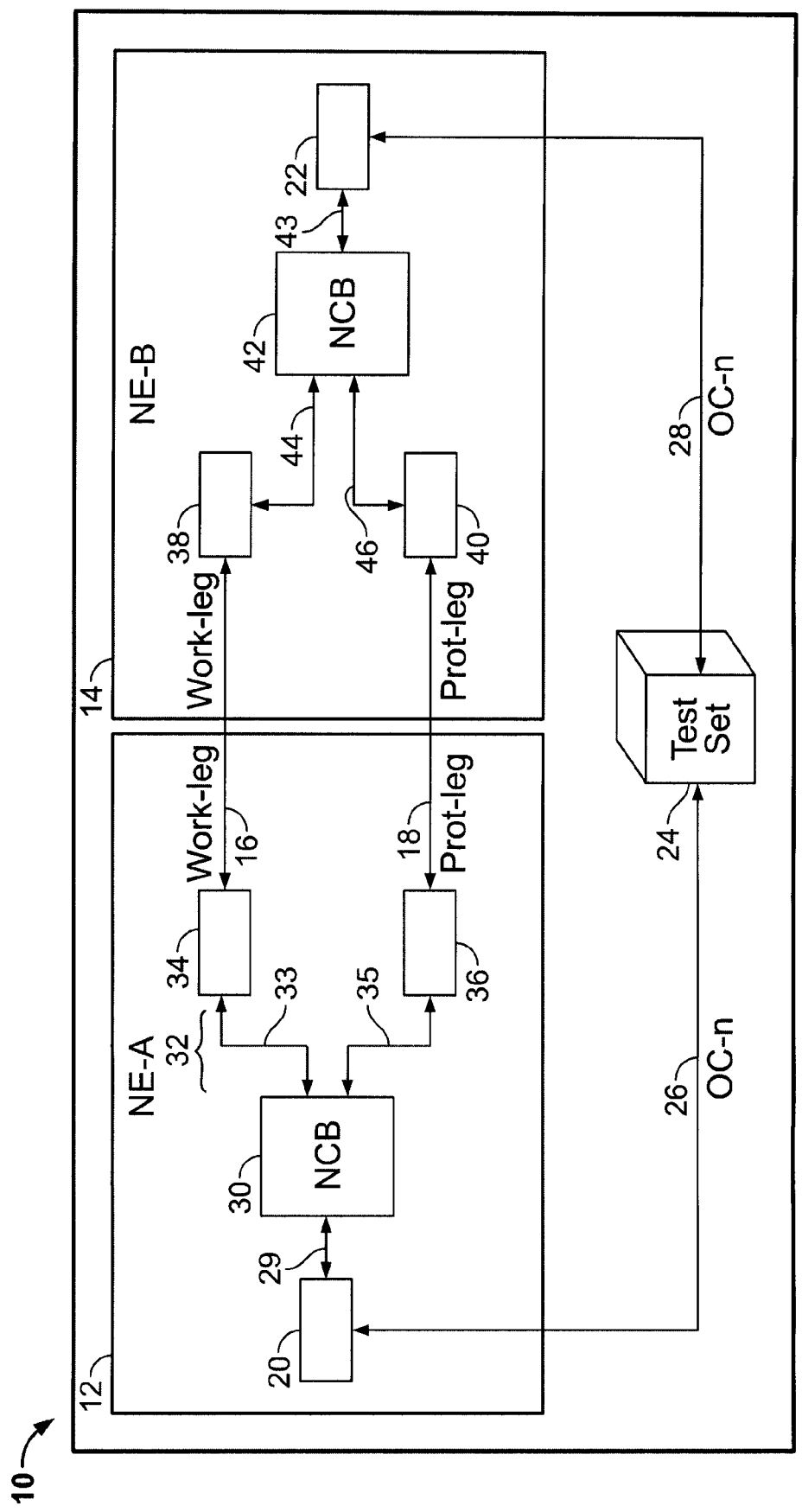
FIG. 1 illustrates a block diagram of an exemplary SNC system.

FIG. 1 illustrates a sub-network connection (SNC) system 10 formed in accordance with an embodiment of the present invention. The SNC system 10 includes a head end node 12 and a tail end node 14. The head end node 12 is also designated as node or network element A (NE-A), and the tail end node 14 is designated as NE-B. By way of example only, two routes or channels 16 and 18 are illustrated as extending between the head and tail end nodes 12 and 14. The head end node 12 includes an input/output board (I/O board) set 20, which transmits and/or receives traffic signals to/from the SNC system 10. Similarly, the tail end node 14 includes an I/O board set 22 that transmits and/or receives traffic signals to/from the SNC system 10. The I/O boards set 20 and 22 also communicate with other nodes in the network via optical fiber connections 26 and 28. For convenience, the figure show 26 & 28 connected to test equipment. The term "set" is used to indicate that multiple I/O boards are included within each of I/O board set 20 and I/O board set 22.

The I/O board set 20 conveys traffic signals to and from a network control board (NCB) 30 which controls a bridging operation (generally denoted at 32). The traffic signals are split at bridge point 32 to I/O board sets 34 and 36. The I/O board set 20 communicates with the NCB 30 over a link 29, while the NCB 30 communicates with the I/O board sets 34 and 36 over links 33 and 35, respectively. The shading at links 33 and 35 denotes that a common or multiple different traffic signals are being simultaneously carried over both links 33 and 35 through multiple VO boards in accordance with a bridging operation. The I/O board sets 34 and 36 communicate along channels 16 and 18 with I/O board sets 38 and 40, respectively, in the tail end node 14. The I/O board sets 38 and 40 are joined with an NCB 42 through links 44 and 46, respectively.

The shading at link 46 denotes that at least one I/O board within I/O board set 40 is active and thus transmitting the received traffic signal through the NCB 42 to the I/O board set 22. The link 44 between I/O board set 38 and NCB 42 is not shaded indicating that I/O board set 38 is in an inactive or deactivated state in the example of FIG. 1. Only one of I/O board sets 38 and 40 may be active at any point in time. The traffic signal(s) received at the NCB 42 is conveyed over link 43 to the I/O board set 22.

In the example of FIG. 1, sets of I/O boards and NCB's are illustrated. However, it is understood that other structure, both hardware and software, may be utilized in place thereof or in addition thereto. The I/O boards represent an explemplary type of input/output module that may be utilized to receive and transmit traffic signals to, from and within the SNC system 10. Throughout the present application, the term "line module" shall be used to generically reference circuitry, components, devices and structures that receive and transmit traffic signals, one example of which is an I/O board. By way of example only, each line module may include local memory and a processor, controller, CPU or the like that performs local controls and operations as explained below. Throughout the present application, the term control module shall be used generally to refer to network control boards and any other device, circuitry, component or structure that is capable of performing the described operations.

In the example of FIG. 1, the I/O board sets 34, 36, 38, and 40, have been organized into a working leg (corresponding to channel 16) and a protection leg (corresponding to channel 18). The terms "working leg" and "protection leg" are intended to have their normal meaning as understood in the field. In general, a working leg represents a primary leg or path, over which traffic signals are conveyed, while a protection leg represents a backup or auxiliary path over which redundant traffic signals are simultaneously conveyed.

Figure 2:
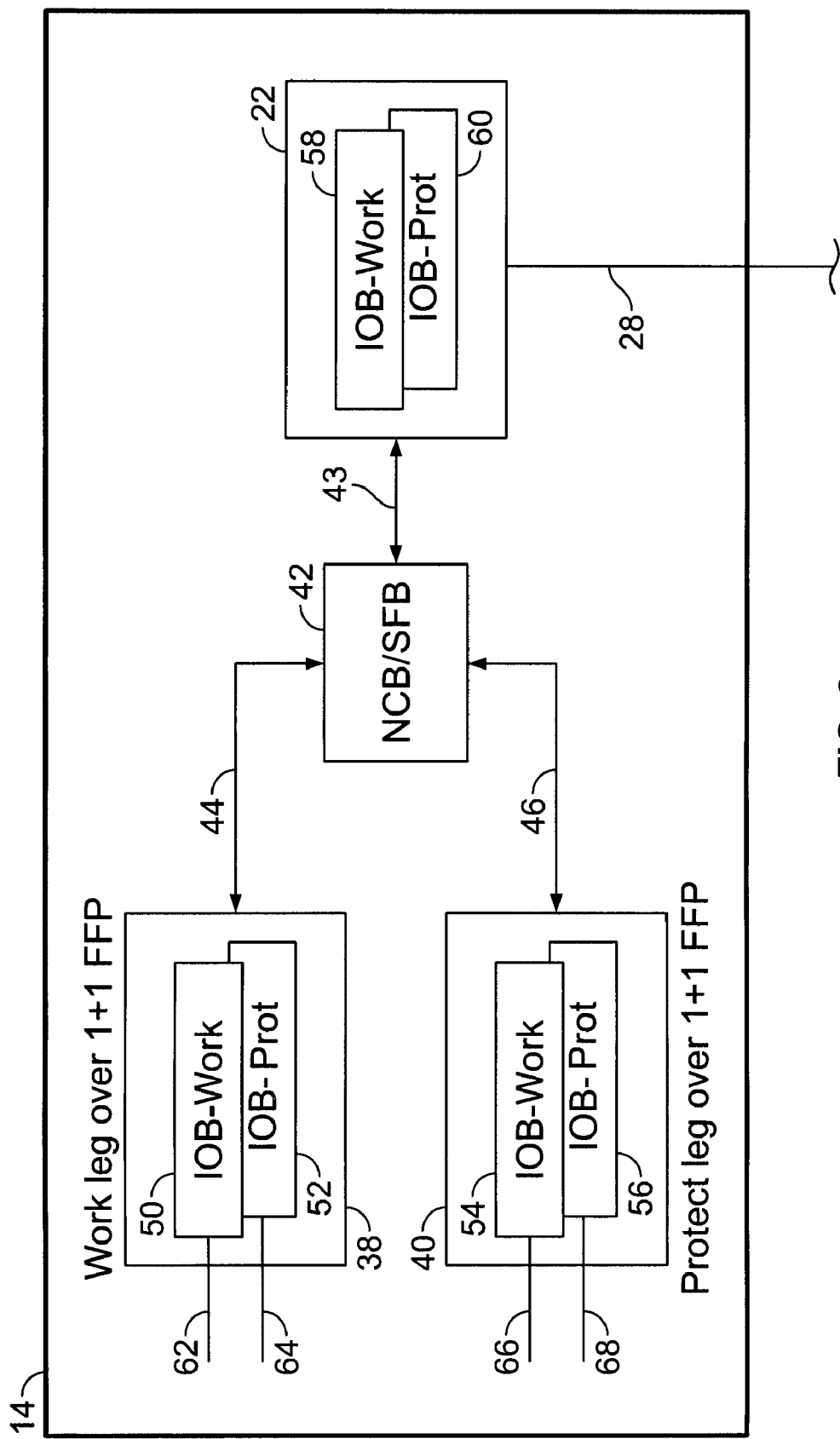
FIG. 2 illustrates a block diagram of a tail end node, implementing a lower layer 1+1 protection scheme.

FIG. 2 illustrates the tail end node 14 in more detail, including I/O board sets 22, 38, and 40 that communicate with one another via links 43, 44, and 46 through the NCB 42. The I/O board set 38 includes primary and back-up I/O boards 50 and 52, while I/O board set 40 includes primary and back-up I/O boards 54 and 56. I/O board set 22 includes primary and back-up I/O boards 58 and 60. Hereafter, I/O boards 50-56 shall be referred to as primary or working IOB's and back-up or protection IOB's, accordingly. Each of I/O board sets 38, 40 and 22 include a working IOB (50, 54 and 58) and a protection IOB (52, 56 and 60). Each of the working and protection IOB's 50-56 include separate, incoming channels 62, 64, 66 and 68, respectively. Within I/O board set 38, only one of the working and protection IOB's 50 and 52 is active, and in turn, conveys the received traffic signal onto link 44. Similarly, the I/O board set 40 includes a working IOB 54 and a protection IOB 56, only one of which is active. While the working and protection IOB's 54 and 56 both receive redundant incoming traffic at incoming channels 66 and 68, respectively, only the active one of the working and protection IOB's 54 and 56 outputs the traffic signal onto link 46. In the present example, only I/O board set 40 is active, and thus (as denoted by the shaded region proximate link 46), traffic signals are only conveyed along link 46 to the NCB 42, not along link 44. Only a single active leg is maintained within the SNC system 10 of FIG. 2, where the active leg (either a working leg or a protection leg) feeds the traffic signal to the termination point (represented by I/O board set 22 in FIGS. 1 and 2).

In the example of FIG. 2, the NCB 42 may be part of a single cell switching fabric. Alternatively, the NCB 42 may be separate from the switching fabric, where the switching fabric may comprise multiple cells.

In the example of FIG. 2, two levels or layers of protection are provided to improve the survivability and reliability of traffic signals carried through the SNC system 10. The layers or levels of protection are afforded by providing redundant working and protection IOB's (or line modules, more generally). The first or lower layer of protection and redundancy is internally within each of the I/O board sets 38, 40 and 22. In the example of FIG. 2, the working and protection IOB's 50 and 52 define a lower protection scheme known as "1+1 protection." Similarly, the I/O board set 40 associated with the protection leg is also afforded 1+1 protection as is the I/O board set 22 associated with the termination point.

In general, the term redundancy, as used throughout, represents the use of a backup (protection) module within the system, in the event that the primary (working) module fails. Redundancy is used to ensure reliability and continuous flow-through of the traffic signal. A 1+1 protection scheme affords one form of redundancy that is provided when each primary (working) IOB is paired with a unique and corresponding backup (protection) IOB. 1+1 protection enables the equipment to overcome single board failures. 1+1 protection enables hitless protection switching, meaning that, in the event of an IOB failure, the SNC system 10 is able to switch to a protection or backup board before synchronization is lost with the frames in the data structure carried within the traffic signal.

In the example of FIG. 2, by providing 1+1 protection, each working IOB, 50, 54, and 58, is paired with a protection IOB, 52, 56, and 60, of the same type. Hence, when a working IOB fails, the traffic is switched intra-leg to its corresponding, paired protection IOB. In the event that the failure is resolved at the working IOB, the traffic may be automatically reverted back to the working IOB. An upper level or layer of protection is also provided, also referred to hereafter as the SNC protection scheme, as it provides hitless protection to the overall SNC system 10. The upper level protection scheme affords protection when failures occur in both of the working and protection IOBs 50 and 52 in the I/O board set 38. In accordance with the SNC protection scheme, traffic is switched inter-leg from the I/O board set 38 (working leg) to one of the working and protection IOBs 54 and 56 in the I/O board set 40 (protection leg). Continuing with the above example, the SNC protection scheme may first switch or roll traffic to the working IOB 54. If the IOB 54 later fails, the 1+1 protection scheme will switch or roll traffic intra-leg to the protection IOB 56.

In each of the above inter-leg and intra-leg switching or rolling operations, the failing IOB is deactivated and the new IOB is activated hitlessly, namely without losing frame synchronization.

Figure 3:
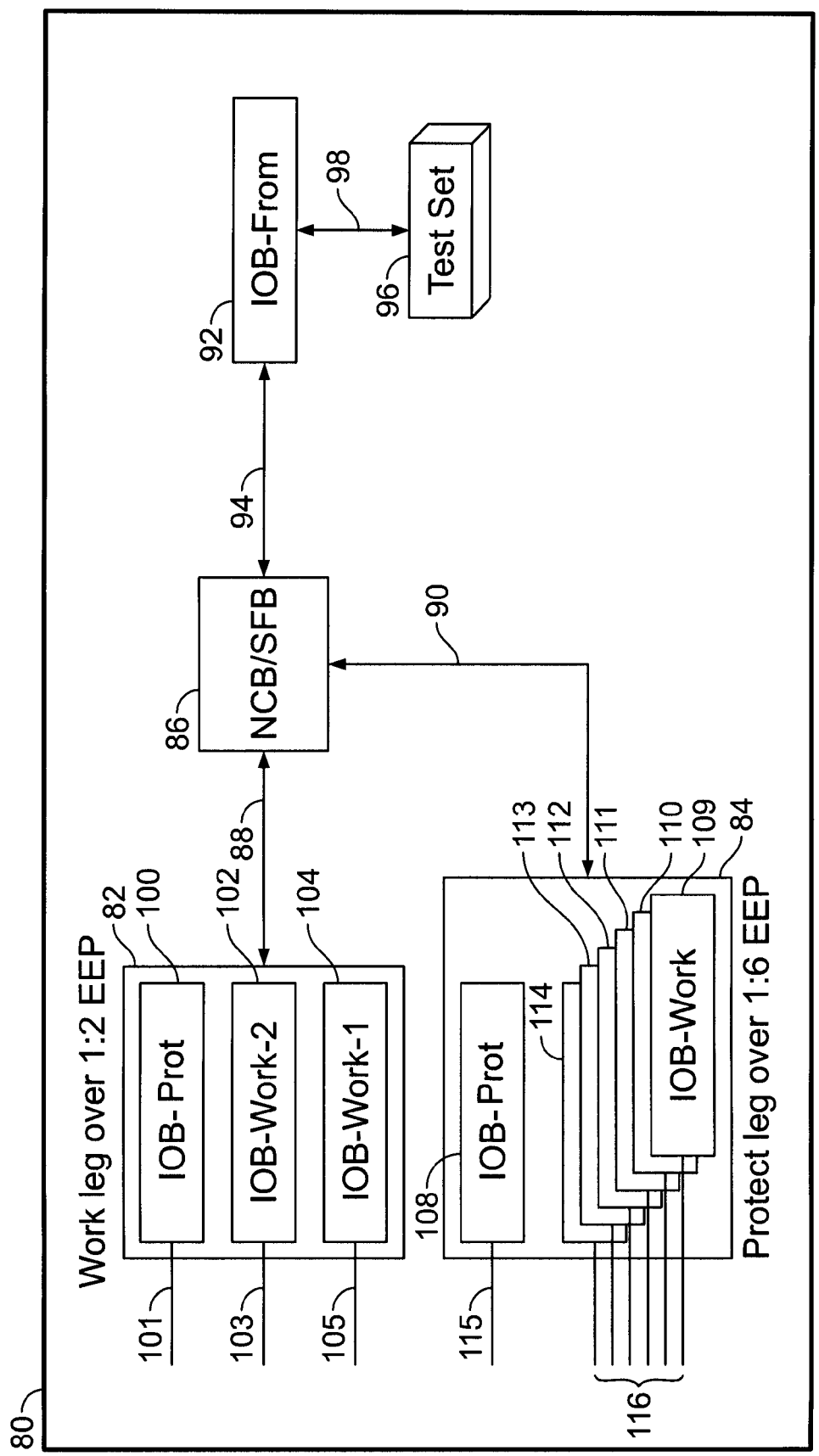
FIG. 3 illustrates a block diagram of a tail end node implementing a lower level 1:N protection scheme.

FIG. 3 illustrates an alternative embodiment for a tail end node 80 that utilizes an alternative lower level protection scheme. The tail end node 80 includes I/O board sets 82 and 84 joined with an NCB 86 over links 88 and 90, respectively. The NCB 86 is joined to a termination point I/O board set 92 over link 94. A test set 96 is joined to the termination I/O board set 92 over link 98. The I/O board sets 82 and 84 are organized into a working leg and a protection leg, respectively, in accordance with an upper layer protection scheme (e.g., an SNC protection scheme). The I/O board sets 82 and 84 each include more than one I/O board (or more generally more than one line module). The I/O board set 82 includes a single protection IOB 100 and two working IOB's 102 and 104. The I/O board set 84 also includes a single protection IOB 108, and a series of working IOB's 109-114.

The configuration illustrated in FIG. 3 corresponds to a 1:N protection scheme. The 1:N protection scheme allows a single protection IOB to protect one of the multiple working IOBs in the set. For example, when each of channels 103 and 105 convey separate and distinct traffic channels that are not redundant to one another, the protection IOB 100 provides protection for one of the working IOB's 102 and 104.

Similarly, the channels 116, joined with the working IOB's 109-114, also convey separate and distinct traffic signals, not redundant traffic signals. At least two of the working IOBs 109-114 may be redundant to, and carry the same SNC traffic signals, as working IOBs 102 and 104. The protection IOB 108 provides redundant protection for the working IOB's 109-114 based on a predetermined prioritization scheme, under which the protection IOB 108 receives traffic signals redundant with a select one of channels 116 at any point in time. As in the embodiment of FIG. 2, when a failure occurs within the I/O board set 82 (e.g., such as in working IOB 102), the protection IOB 100 is activated and begins transmitting traffic signals (e.g., intra-leg switching) in place of working IOB 102 over link 88 based on the 1:N protection scheme. In the event that the protection IOB 100 fails, the traffic is hitlessly switched or rolled inter-leg to a corresponding one of working IOBs 109-114, for example working IOB 109 based on the SNC protection scheme. Should working IOB 109 later fail, the traffic is intra-leg switched to protection IOB 108 based on the 1:N protection scheme. Hence, traffic switching or rolling is able to be automatically moved across the entire SNC system 10, without loss of frame synchronization.

By way of example only, each protection and working IOB (and more generally each line module) may include memory and a local controller. The memory may store, among other things, state maps accessed by the controller of the individual I/O board to activate and deactivate the I/O board.

FIG. 4 illustrates a state map collection 120 that are associated with individual I/O boards and that define the state of such I/O boards (e.g., active or inactive). The state map collection 120 includes SNC maps 122, 124, 126 and 128 that are controlled and updated by a respective NCB (e.g., NCB 42 in FIG. 2). The state map collection 120 also includes a plurality of 1+1 state maps 130, 132, 134, and 136 that are controlled and updated by corresponding I/O boards (e.g., the working and protection IOB's 52, 54, 56 and 58 in the embodiment of FIG. 2). The state map collection 120 further includes a group of composite virtual tributary (VT) maps 138, 140, 142 and 144. The VT maps 138-144 represent logical combinations of corresponding SNC maps and 1+1 maps. More specifically, the VT map 138 represents the logical AND combination of the SNC map 122 and the 1+1 map 130. Similarly, the VT map 140 represents the logical AND combination of the SNC map 124 and the 1+1 map 132. The VT maps 142 and 144 each represent the logical AND combinations of the corresponding SNC maps 126, 128 and 1+1 maps 134 and 136, respectively.

The state map collection 120 is shown for illustration purposes only grouped based on the working and protection legs and organized based on the I/O board arrangement. More specifically, the state map collection 120 is divided into working state maps 146 and protection state maps 148. The working state maps 146 are updated to control the active and inactive states of the I/O boards within the I/O board set 38 (FIG. 2). The protection state maps 148 activate and deactivate the I/O boards within the I/O board set 40. The individual state maps within the working state maps 146 are divided based upon the IOB to which each state map is associated. More specifically, the SNC map 122, 1+1 map 130 and VT map 138 are associated with the protection IOB 52. The SNC map 124, 1+1 map 132 and VT map 140 are associated with the working IOB 50. The SNC map 126, 1+1 map 134 and VT map 142 are associated with the protection IOB 56, while the SNC map 128, 1+1 map 136 and VT map 144 are associated with the working IOB 54.

While not illustrated, the collection of state maps similar to those of FIG. 4 also are utilized in connection with the embodiment of FIG. 3. However, in the embodiment of FIG. 3, a 1:N protection scheme is utilized and thus more than two I/O boards are provided within each I/O board set. In I/O board set 82 (FIG. 3), a protection IOB 100 and two working IOB's 102 and 104 are used. Hence, the corresponding state map collection would include an SNC map, a 1:N map and a VT map for protection IOB 100. Similarly, the state map collection would include separate SNC maps, separate 1:N maps and separate VT maps for each of the working IOB's 102 and 104, all associated with the working leg.

In addition, the state map collection associated with the embodiment of FIG. 3 would also include protection leg state maps associated with the I/O board set 84. The I/O board set 84 includes one protection IOB and six working IOB's. Hence, the corresponding protection leg state map set would include an SNC map, a 1:N map and a VT map for each of the protection and work IOB's 108-114.

Returning to the embodiment of FIGS. 2 and 4, each working and protection IOB 50-56 includes memory storing at least its corresponding VT map 138-144, respectively. . The 1+1 maps 130-136 may be stored in the memory of the protection and working IOB's 52-58.

Figure 5:
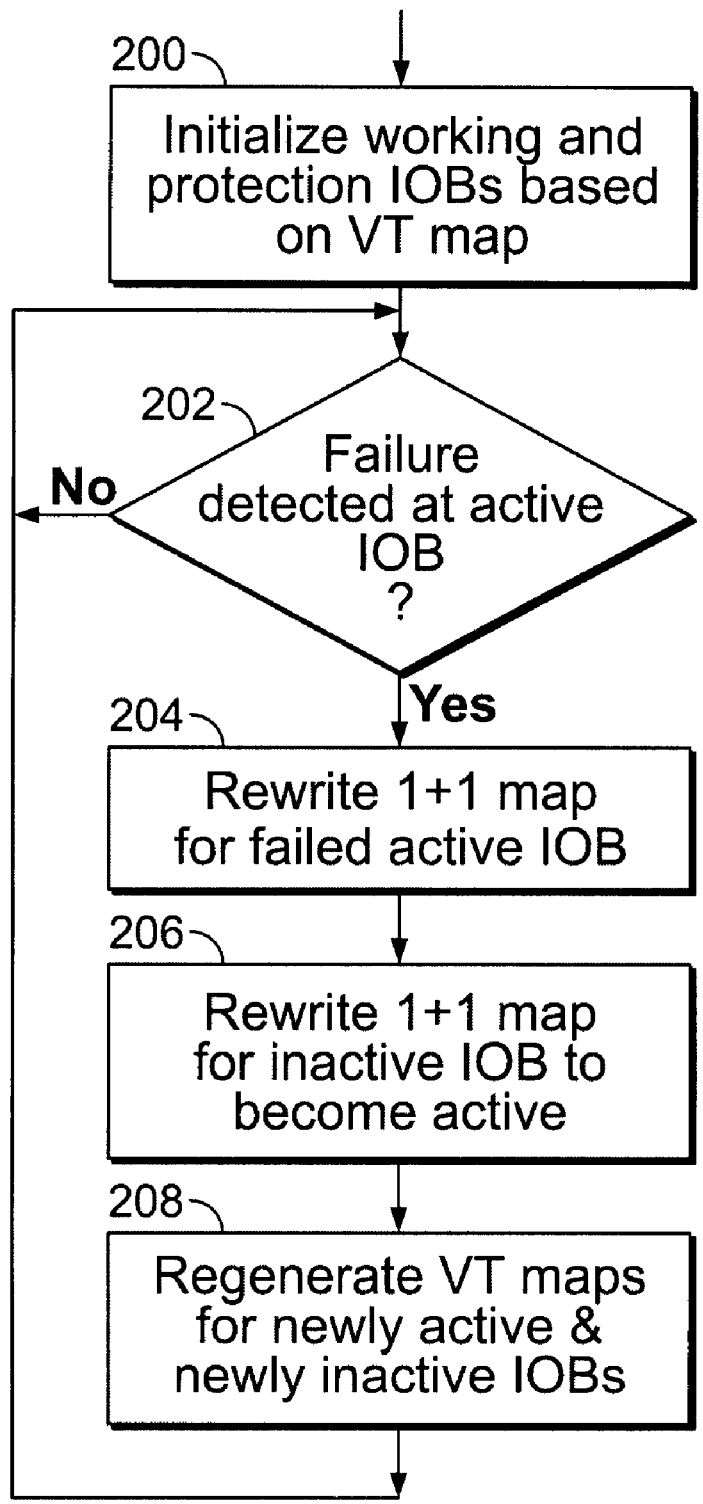
FIG. 5 illustrates a exemplary processing sequence used to perform intra-leg switching.

FIG. 5 illustrates the processing sequence carried out in connection with the embodiments of FIGS. 1-4 to implement the lower level protection scheme (e.g., the 1+1 protection scheme of FIGS. 2 and 4 or the 1:N protection scheme of FIG. 3). It is understood that the sequence of FIG. 5 may be implemented with other embodiments that entirely differ from those disclosed in FIGS. 1-4. For convenience, the process of FIG. 5 is described in connection with FIGS. 2 and 4.

Beginning at 200, each working and protection IOB 50-56 is initialized based on its corresponding VT map (e.g, 138-144 in FIG. 4). At 202, each protection and working IOB 50-56 begins monitoring traffic signals carried there through to detect failures. Failures may arise in many forms. For example, failures may arise due to hardware faults, or alternatively, for signal degradation due to the channel. Once a failure is detected, processing passes to 204, at which the 1+1 map for the failed active IOB is rewritten. For example, if the working IOB 50 in FIG. 2 failed, the 1+1 map 132 in FIG. 4 is rewritten from all "1" to all "0." At 206, the 1+1 map for the corresponding inactive protection IOB is rewritten to an active state. In the foregoing example, the protection IOB 52, would represent the inactive IOB to become active. Hence, the 1+1 map 130 would be rewritten from all "0" to all "1" signifying that the protection IOB 52 should become active.

Thereafter, at 208 the 1+1 maps for the newly active and newly inactive IOB's are logically ANDed with the corresponding SNC map. In the example of FIG. 2, at 208, the 1+1 maps 130 and 132 (now in their new states, inverted from those shown in FIG. 4), would be ANDed with the corresponding SNC maps 122 and 124, respectively, to produce new VT maps 138 and 140. Hence, once the 1+1 map 130 is inverted to all "1" the VT map 138 would similarly be inverted to all "1" thereby activating the protection IOB 52. Similarly, when the 1+1 map 132 is inverted to all "0" the newly created VT map 140 would similarly be all "0" thereby deactivating the working IOB 50.

Figure 6:
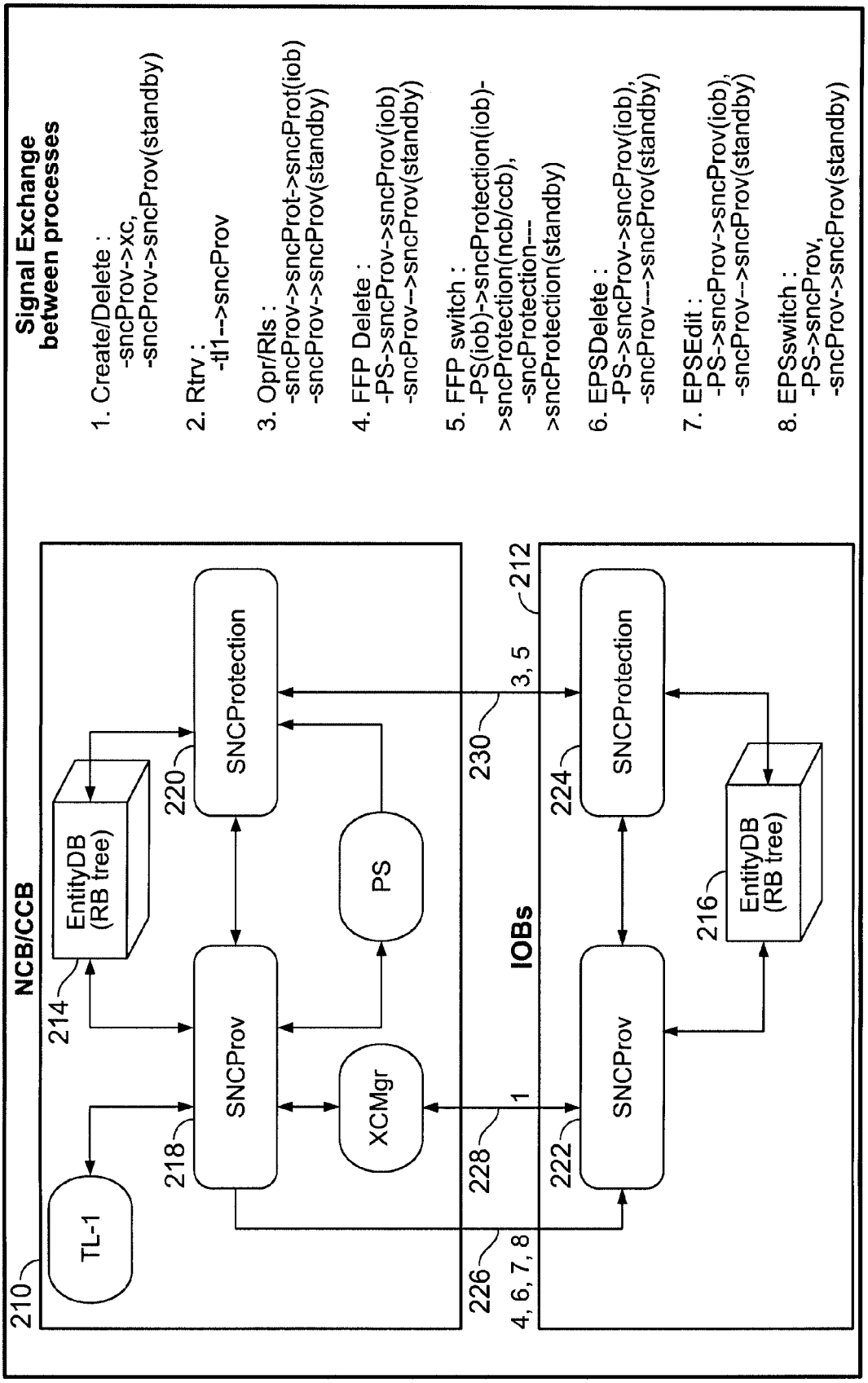
FIG. 6 illustrates a process model for an SNC system.

FIG. 6 illustrates a process model for a system configuration in accordance with an embodiment of the present invention. A block 210 denotes an NCB/CCB, while block 212 denotes an IOB. The NCB 210 contains a memory or database 214, while the IOB contains a memory or database 216. Databases 216 store, among other things, the state maps as discussed above in connection with FIG. 4. The oval-shaped elements within the NCB 210 and IOB 212 represent software processes or tasks. For example, process 218 performs SNC provisioning of IOBs, while process 220 performs SNC protection tasks. Similarly, process 222 and process 224 perform SNC provisioning of IOBs and SNC protection tasks at the IOB. The paths 226, 228 and 230, correspond to communication links or threads between certain processing tasks.

A key is provided along the right side, identifying the signals that are exchanged between processes along the corresponding paths 226-230. For example, an operate and release task (#3) is exchanged between the SNC protection processes 220 and 224, as is an FFP switch (#5). The signals exchanged between the SNC provision processes 218 and 222 include an FFP delete (#4), an EPS delete (#6), an EPS edit (#7), and an EPS switch (#8). The EPS delete, edit and switch signals are utilized in connection with a configuration having 1:N protection at the lower protection layer (e.g., within the I/O board sets). The FFP delete and FFP switch signals are utilized in connection with a 1+1 protection scheme at the lower protection layer. The FFP delete or EPS delete signals are used to turn off the 1+1 protection or 1:N protection. The EPS edit signal disables a particular IOB, while the EPS switch initiates a switchover operation between an old failing activated IOB and a newly activated IOB. The FFP switch is used to switch between working and protection IOB's within a 1+1 protection scheme. The create/delete, retrieve and operate and release signals are utilized at the tier 1 level. The create/delete signal creates or deletes an IOB from the available group of IOB's. The retrieve command obtains desired information about an IOB. The operate and release signal places a particular IOB on the list of available, yet inactive, IOB's or alternatively takes an IOB off of the list of available, inactive IOB's.

Figure 7:
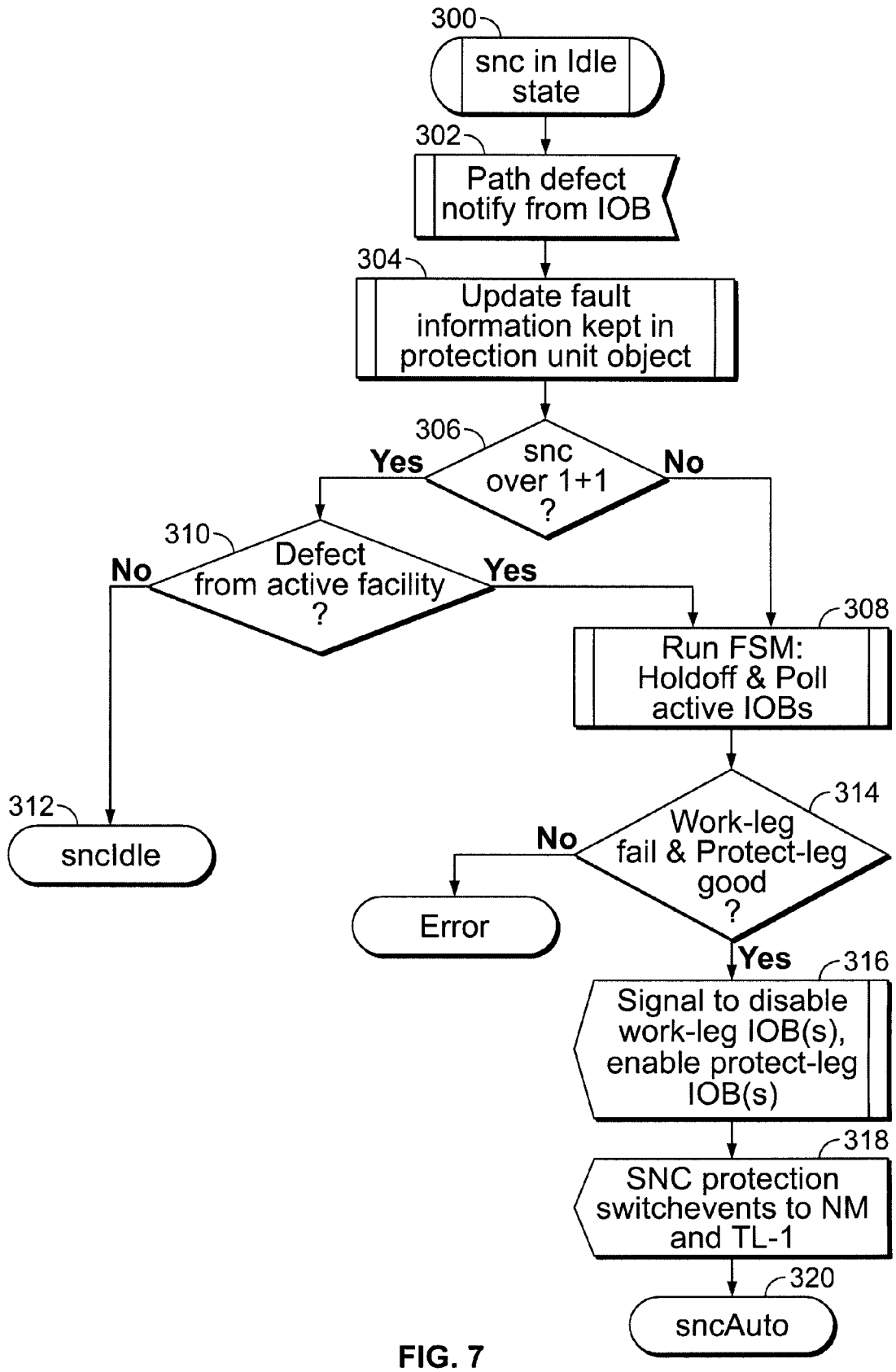
FIG. 7 illustrates a processing sequence for performing inter-leg switching.

FIG. 7 illustrates an SNC auto-switching flow diagram. Beginning at 300, the SNC is in an idle state. At 302, the NCB is notified by an IOB of a path defect. At 304, the NCB updates the database with the defect received. At 306, the NCB determines the types and layers of protection being utilized. In the example of FIG. 7, the NCB determines whether the SNC is using a multi-tiered protection scheme, having an SNC protection layer over a 1+1 lower protection layer. If no, control moves to 308 where an FSM process is run and the active IOB's are polled. If at 306 the determination is yes, control moves to 310 where it is determined whether the defect arose from an active IOB. If no, flow passes to 312 where the NCB returns to an idle state. If at 310, the determination is yes, flow passes to 308, where the active IOB's are polled. At 314, the NCB determines whether a working leg has failed and a protection leg remains good. If all working and protection legs have failed, an error occurs. If the working leg has failed, yet a protection leg remains good, flow passes to 316, where the NCB passes a signal to the IOB's of the corresponding working leg, instructing such IOB's to disable or deactivate. The NCB also passes a signal to the IOB's of the corresponding protection leg in order to enable or activate such IOB's. At 318 the switch completion notification is sent to management system. At 320, the switching operation is completed by entering the "sncAuto" state.

Figure 8:
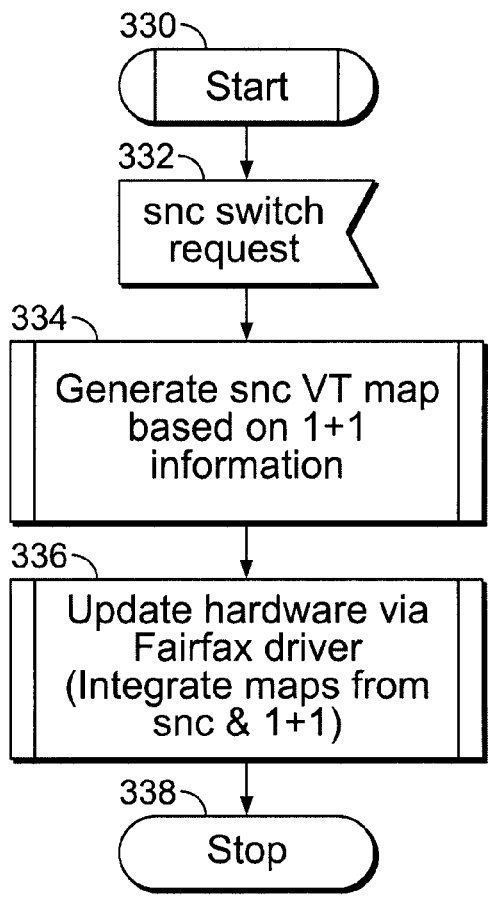
FIG. 8 illustrates a automatic switching flow diagram for a process utilized in connection with inter-leg switching.

FIG. 8 illustrates a more detailed flow diagram of an automatic switching operation for the SNC. At 330, the process is started (corresponding to point 320 in FIG. 7). At 332, an SNC switch request is made by the NCB to the IOB's. At 334, an SNC VT map is generated based on the 1+1 map of information for the corresponding IOB. At 336, the hardware of the IOB is updated through a fairfax driver with the logical combination ANDed of the SNC maps and 1+1 maps for the corresponding IOB's. At 338, the process is stopped.

Figure 9:
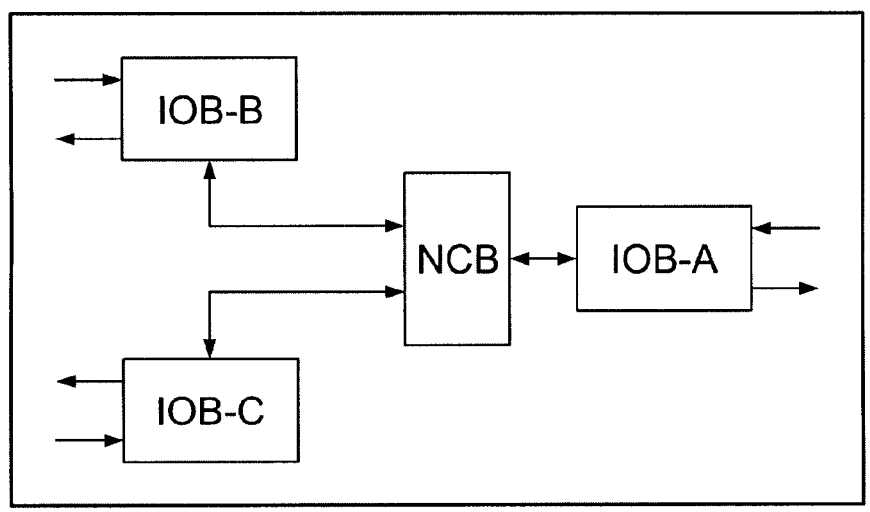
FIG. 9 illustrates an alternative embodiment supporting a multi-mode combination of nodes.

FIG. 9 illustrates an embodiment of the present invention that supports SNC protection for non-SONET/mixed mode combinations (with 1+1, 1:N or UPSR protection as lower level protection). The mixed mode combination may include an IOB-A operating in a DS1 mode, while the IOB-B and IOB-C operate in a VT mode. The mixed mode combination may alternatively include the IOB-A operating in a VT mode, while the IOB-B and IOB-C operate in DS1 mode. As a further option, the mixed mode combination may include the IOB-A operating in a VT mode, while the IOB-B operates in a DS1 mode and the IOB-C operates in a VT mode.

The various embodiments support head-end to tail-end automation of bridge and roll operations using, among other things, path trace messages. The path trace may be supported over unused payload or overhead bytes in VT SPE (e.g. Z6/Z7) or STS SPE (e.g. Z3/Z4). The path trace also allows NM to verify the continuity of paths before and after roll operations and auto switches.

The foregoing processes permit intra-leg and inter-leg switching between IOBs (or more generally line modules) through multiple different layers of switching protection schemes without losing frame synchronization.

Optionally, the levels or layers of protection may include an upper layer or level of SNC protection and a lower layer or level of UPSR protection, wherein the lower UPSR protection is at the path level (e.g. STS-1 or VT-1.5).

While the invention has been described in terms of various specific embodiments, those skilled in the art will recognize that the invention can be practiced with modification within the spirit and scope of the claims.

What is claimed is:

1. A sub-network connection system, comprising:
line modules configured to receive bridged traffic signals over individual corresponding channels, said line modules being grouped into sets at a lower protection layer, said sets of line modules being organized into working legs and protection legs at an upper protection layer, wherein said line modules are activated/deactivated based on different upper and lower protection schemes associated with said upper and lower protection layers;
state maps associated with each of said line modules, said state maps storing state data that activates and deactivates said line modules, said state maps being updated in accordance with said lower protection scheme to perform intra-leg switching between said line modules in one of said working and protection legs, said state map being updated in accordance with said upper protection scheme to perform inter-leg switching between a first line module in one of said working and protection legs and a second line module in another of said working and protection legs; and
a network control module interconnected with said line modules, said network control module performing inter-leg switching by updating said state data in said state maps for corresponding line modules in associated working and protection legs.

2. The sub-network connection system of claim 1, wherein said line modules constitute I/O boards and said network control module performs a switch operation between a working I/O board in said working leg and a working I/O board in said protection leg when a defect is experienced in said traffic signal.

3. The sub-network connection system of claim 1, wherein said lower and upper protection schemes constitute a 1+1 protection scheme and a sub-network connection protection scheme.

4. The sub-network connection system of claim 1, wherein said upper and lower protection schemes constitute a 1:N equipment protection scheme and a sub-network connection protection scheme.

5. The sub-network connection system of claim 1, wherein said lower protection scheme constitutes one of a 1+1 protection scheme, a 1:N equipment protection scheme and a UPSR protection scheme.

6. The sub-network connection system of claim 1, wherein each of said state maps is stored in memory on an associated one of said line modules.

7. The sub-network connection system of claim 1, further comprising a single cell switch fabric containing said network control module.

8. The sub-network connection system of claim 1, further comprising a multi-cell switch fabric containing multiple switch fabrics separate and remote from said network control module.

9. The sub-network connection system of claim 1, wherein said line modules generate a lower layer state map based on one of 1+1, UPSR and 1:N protection schemes and said network control module generates an upper layer state map based on an SNC protection scheme, corresponding said upper and lower state maps being logically combined to create said state maps.

10. The sub-network connection system of claim 1, wherein said state maps are stored on one of said network control module and corresponding said line modules.

11. The sub-network connection system of claim 1, wherein said line modules perform intra-leg switching by updating said state maps for corresponding line modules all in a common single working leg.

12. The sub-network connection system of claim 1, wherein said line modules are housed within one of a cross-connect and add/drop multiplexer and support one of uni-directional and bi-directional switching.

13. The sub-network connection system of claim 1, wherein the line modules constitute a non-SONET/mixed mode combination.

14. The sub-network connection system of claim 1, wherein a first line module operates in a VT mode and a second line module operates in a DS1 mode.

15. A method for protection switching in a sub-network connection, comprising:
  receiving traffic signals at line modules that are grouped into sets, where said sets of line modules are organized into working legs and protection legs;
  storing state data in state maps associated with each of said line modules;
  inter-leg switching between a first line module in one of said working and protection legs and a second line module in another of said working and protection legs by updating said state maps in accordance with an inter-leg protection scheme; and
  activating and deactivating said line modules based on updates to said state maps.

16. The method of claim 15, further comprising intra-leg switching between said line modules in one of said working and protection legs by updating said state maps in accordance with an intra-leg protection scheme.

17. The method of claim 16, wherein said intra-leg protection scheme is one of 1+1 protection, 1:N protection, and UPSR protection.

18. The method of claim 15, wherein said inter-leg protection scheme is SNC protection.

19. The method of claim 15, wherein said state maps are stored in memory on corresponding line modules.

20. The method of claim 15, further comprising generating separate intra-leg and inter-leg state maps and logically combining said intra-leg and inter-leg state maps to create said state maps associated with each of said line modules.

21. The method of claim 15, further comprising monitoring said traffic signals for defects and performing said inter-leg switching when a defect is detected.

22. The method of claim 15, further comprising monitoring said traffic signals for defects and updating fault information when a defect is detected.

23. The method of claim 15, further comprising monitoring said traffic signals for defects and, when a defect is detected, determine whether an intra-leg protection scheme exists.

24. The method of claim 15, further comprising identifying an intra-leg protection scheme before performing said inter-leg switching.

25. The method of claim 15, wherein the line modules constitute a non-SONET/mixed mode combination.

26. The method of claim 15, wherein a first line module operates in a VT mode and a second line module operates in a DS1 mode.

27. The sub-network connection system of claim 1, wherein said network control module performing inter-leg switching based on said upper protection scheme by updating said state data in said state maps for corresponding line modules in associated working and protection legs, said line modules performing intra-leg switching based on said lower protection scheme by updating said state data in said state maps.

* * * * *